United States Patent
Jiang et al.

(10) Patent No.: US 11,203,538 B2
(45) Date of Patent: Dec. 21, 2021

(54) REMEDIATION SYSTEM AND METHOD BASED ON POLLUTION OBSTRUCTION FOR UNDERGROUND WATER WITH DNAPL POLLUTANT

(71) Applicant: CHINESE RESEARCH ACADEMY OF ENVIRONMENTAL SCIENCES, Beijing (CN)

(72) Inventors: Yonghai Jiang, Beijing (CN); Yu Yang, Beijing (CN); Beidou Xi, Beijing (CN); Xinying Lian, Beijing (CN); Huan Huan, Beijing (CN); Fu Xia, Beijing (CN); Yongfeng Jia, Beijing (CN); Xu Han, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 384 days.

(21) Appl. No.: 16/196,913

(22) Filed: Nov. 20, 2018

(65) Prior Publication Data

US 2019/0152815 A1 May 23, 2019

(30) Foreign Application Priority Data

Nov. 20, 2017 (CN) .......................... 201711163537.X

(51) Int. Cl.
*C02F 1/58* (2006.01)
*C02F 1/28* (2006.01)
(Continued)

(52) U.S. Cl.
CPC ................ *C02F 1/58* (2013.01); *B09B 1/002* (2013.01); *B09C 1/00* (2013.01); *C02F 1/28* (2013.01);
(Continued)

(58) Field of Classification Search
CPC ....... B09C 1/002; B09C 1/02; B09C 2101/00; B09C 1/00; C02F 2103/06
(Continued)

(56) References Cited

U.S. PATENT DOCUMENTS 4,293,425 A 10/1981 Price
5,435,666 A * 7/1995 Hassett .................. B09C 1/005
405/128.45

(Continued)

FOREIGN PATENT DOCUMENTS

| CN | 102976490 A | 3/2013 |
| CN | 103601280 A | 2/2014 |
| CN | 106277386 A | 4/2019 |

OTHER PUBLICATIONS

Chang Miao et al., Small Towns, Rural Domestic Sewage Decentralized Treatment Facility Construction Management System, Jan. 31, 2012, pp. 237-238, China Environmental Science Publishing House, Beijing, China.

(Continued)

*Primary Examiner* — Claire A Norris
(74) *Attorney, Agent, or Firm* — Rabin & Berdo, P.C.

(57) ABSTRACT

A remediation system based on pollution obstruction for underground water with DNAPL pollutant is provided, including a vertical obstructing wall, a pump-out treating unit and a recharging unit, wherein the vertical obstructing wall is distributed at the periphery of a polluted area to obstruct the polluted underground water in the vertical obstructing wall; the pump-out treating unit includes a plurality of water pumping wells and overground treatment facility that are distributed in the polluted area, the plurality of the water pumping wells are configured to pump the polluted underground water out and sending it into the overground treatment facility so as to be treated; the recharging unit includes a plurality of recharging wells, and water
(Continued)

treated by the overground treatment facility is recharged into a target aquifer in the polluted area by the plurality of the recharging wells. A remediation method using the system is provided.

18 Claims, 1 Drawing Sheet

(51) Int. Cl.
| | |
|---|---|
| *B09C 1/00* | (2006.01) |
| *B09C 1/02* | (2006.01) |
| *B09B 1/00* | (2006.01) |
| *C02F 1/70* | (2006.01) |
| *C02F 1/72* | (2006.01) |
| *C02F 103/06* | (2006.01) |
| *C02F 101/32* | (2006.01) |
| *C02F 101/36* | (2006.01) |

(52) U.S. Cl.
CPC ............... *B09C 1/002* (2013.01); *B09C 1/02* (2013.01); *C02F 1/70* (2013.01); *C02F 1/722* (2013.01); *C02F 2101/32* (2013.01); *C02F 2101/36* (2013.01); *C02F 2103/06* (2013.01); *C02F 2305/04* (2013.01); *Y02A 20/406* (2018.01)

(58) Field of Classification Search
USPC .............. 210/747.7, 170.07; 405/52, 129.45, 405/128.15, 128.3, 129.65
See application file for complete search history.

(56) References Cited

U.S. PATENT DOCUMENTS

| | | | |
|---|---|---|---|
| 5,813,798 A * | 9/1998 | Whitten .................... | B09C 1/00 210/739 |
| 2003/0175081 A1* | 9/2003 | Shiau ...................... | B09C 1/002 405/128.7 |
| 2005/0207847 A1* | 9/2005 | Hayes ....................... | B09C 1/06 405/128.35 |
| 2006/0046297 A1* | 3/2006 | Ball .................... | G01N 15/0826 436/28 |
| 2009/0236899 A1* | 9/2009 | Geisler ................... | E21B 43/28 299/18 |
| 2018/0229281 A1* | 8/2018 | Alexander .............. | C02F 1/285 |
| 2019/0324008 A1* | 10/2019 | Kiyotomo .............. | G01N 21/64 |

OTHER PUBLICATIONS

George Wypych, Handbook of Solvents, Dec. 31, 2002, pp. 1275-1276, Sinopec Press, China.
Office Action of corresponding Chinese Application No. 201711163537.X and English Translation, dated Mar. 4, 2020.

* cited by examiner

REMEDIATION SYSTEM AND METHOD BASED ON POLLUTION OBSTRUCTION FOR UNDERGROUND WATER WITH DNAPL POLLUTANT

CROSS-REFERENCE TO RELATED APPLICATIONS

This application claims the benefit of the Chinese Patent Application No. 201711163537.X filed on Nov. 20, 2017 in China National Intellectual Property Administration and entitled with "REMEDIATION SYSTEM AND METHOD BASED ON POLLUTION OBSTRUCTION FOR UNDERGROUND WATER WITH DNAPL POLLUTANT", the whole disclosure of which is incorporated herein by reference.

FIELD OF THE DISCLOSURE

The disclosure relates to a field of underground water pollution obstruction, and in particular to remediation system and method based on pollution obstruction for underground water with DNAPL pollutant.

DESCRIPTION OF THE RELATED ART

In recent years, with the rapid development of the chemical industry, a large amount of dense nonaqueous phase liquid (DNAPL) enters the soil and underground water every year during production, transmission, storage and use of chemical products and is becoming one type of significant pollutant, such as 1,2-dichloroethane (1,2-DCA), tetrachloroethylene (PCE) and other halogenated hydrocarbons. These DNAPLs have low water solubility and are difficult to be degraded and removed. Most of them are carcinogenic, teratogenic and mutagenic and thus have been considered as toxic and harmful organic pollutants that should be in priority control. Once they enter the environment, they will produce long-term adverse effects on human healthy and ecological environment.

DNAPL has a density larger than water and can generally enter and penetrate the underground water into a saturated aquifer. When migrating down in the saturated aquifer, DNAPL may be not able to penetrate a soil layer with fine particles and accumulate on it to form heavy oil aggregate if the soil layer with fine particles is encountered. DNAPL retained in the soil and the underground water may further migrate due to the action of volatilization, dissolution or external forces, resulting in a greater range of pollution of the soil and the underground water environment. The residual DNAPL pollutants in the saturated aquifer relates to one of the difficulties in underground water remediation. Due to the low water solubility of DNAPL and the high interfacial tension between DNAPL and water, the effect of the traditional pump-out treatment method is poor and a trailing and rebound phenomenon often appears.

SUMMARY

According to an aspect of the present disclosure, a remediation system based on pollution obstruction for underground water with DNAPL pollutant, comprising a vertical obstructing wall, a pump-out treating unit and a recharging unit, wherein the vertical obstructing wall is arranged at a periphery of a polluted area to obstruct polluted underground water within the vertical obstructing wall;

wherein the pump-out treating unit comprises a plurality of water pumping wells and an overground treatment facility that are distributed in the polluted area, the plurality of the water pumping wells being configured to pump the polluted underground water out and send it into the overground treatment facility so as to treat and remove DNAPL pollutants; and wherein the recharging unit comprises a plurality of recharging wells, and water that has been treated by the overground treatment facility is recharged into a target aquifer in the polluted area by the plurality of the recharging wells, the plurality of recharging wells being arranged on a side of the vertical obstructing wall facing towards the polluted area in such a manner that they are closely adjacent to the vertical obstructing wall.

According to another embodiment of the present disclosure, an upper end of the vertical obstructing wall extends beyond the ground surface up to a height of 30 to 50 mm, and a lower end of the vertical obstructing wall is buried in a water resisting floor of the aquifer in the polluted area to form a sealing area with the water resisting floor. The vertical obstructing wall is a HDPE geotechnical membrane having a thickness of 2 to 4 mm According to another embodiment of the present disclosure, there is no sieve pore in each recharging well. An upper end of each recharging well is flush with the upper end of the vertical obstructing wall and a lower end of each recharging well is located 15 to 30 mm above the water resisting floor.

According to another embodiment of the present disclosure, each recharging well has a diameter of 30 to 50 mm. Spacings by which the recharging wells are arranged are inversely proportional to arithmetic square root values of concentrations of pollutants in the underground water in regions of the polluted area, and the maximum spacing is from 5 to 8 m.

According to another embodiment of the present disclosure, the water pumping well has a diameter of 300 to 400 mm.

According to another embodiment of the present disclosure, the overground treatment facility comprises a plurality of water pumps, a plurality of water guiding pipes and a plurality of filler zones. Each of the filler zones corresponds to at least one water pumping well and at least one recharging well, the water pumping well, the filler zone and the recharging well are sequentially connected by the water guiding pipes, and the water pump is disposed between a water inlet end of the water guiding pipe and the water pumping well. Each filler zone is configured to treat the polluted underground water to remove DNAPL.

According to another embodiment of the present disclosure, lengths of the filler zones in different regions of the polluted area are proportional to logarithm values of concentrations of pollutants in the underground water in the respective different regions.

According to another embodiment of the present disclosure, the recharging unit is deployed when the vertical obstructing wall is deployed by forming a slot in the ground.

According to another aspect of the present disclosure, a remediation method using the remediation system based on pollution obstruction for underground water with DNAPL pollutant according to claim 1, comprising the following steps:

(1) deploying the vertical obstructing wall, the pump-out treating unit and the recharging unit based on a polluted area and a pollution level;

(2) pumping the polluted underground water to the ground surface by the pump-out treating unit for treatment to remove DNAPL;

(3) adding a surfactant to the water that has been treated by the pump-out treating unit, then enabling the treated water to enter the target aquifer by the recharging unit and leaving it alone for a given interval time to dissolve and remove DNAPL in the aquifer; and (4) repeating the steps (2) to (3) to circularly dissolve and remove the DNAPL.

According to another embodiment of the present disclosure, the recharging wells in the recharging unit are also used as monitoring wells for underground water remediation effect.

Figure 1:
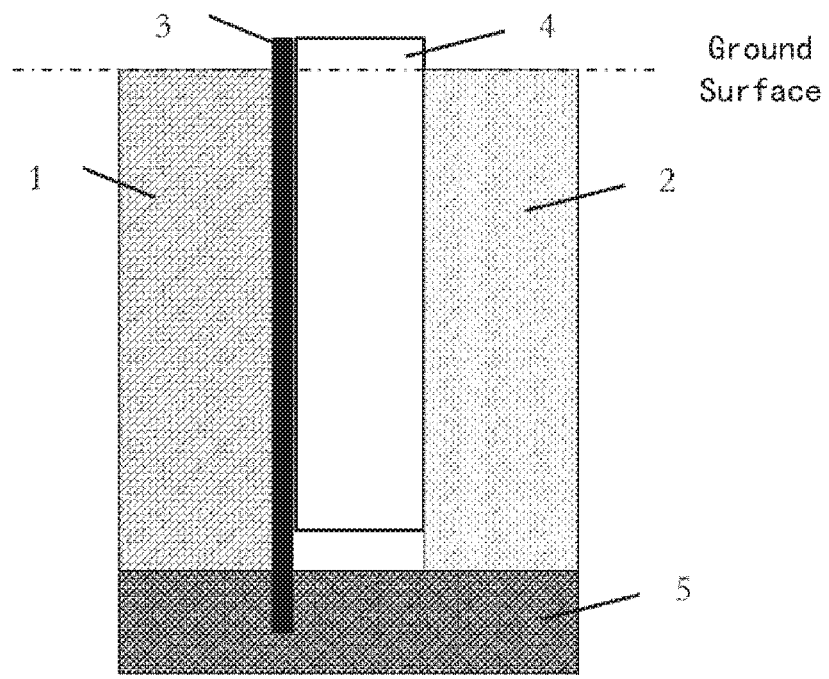
FIG. 1 is a longitudinal cross-sectional view of a vertical obstructing wall and a recharging well according to an embodiment of the present disclosure.

REFERENCE NUMERALS 1. unpolluted area, 2. polluted area, 3. vertical obstructing wall, 4. recharging unit, 5. water resisting floor, 6. overground treatment facility, 7. water pumping unit.

DETAILED DESCRIPTION OF EMBODIMENTS

To make the objects, the technical solution, and the advantages of the present disclosure more clear and easy to be understood, the present disclosure will be further described in detail below with reference to and the accompanying drawings in connection with the specific embodiments of the disclosure.

Figure 2:
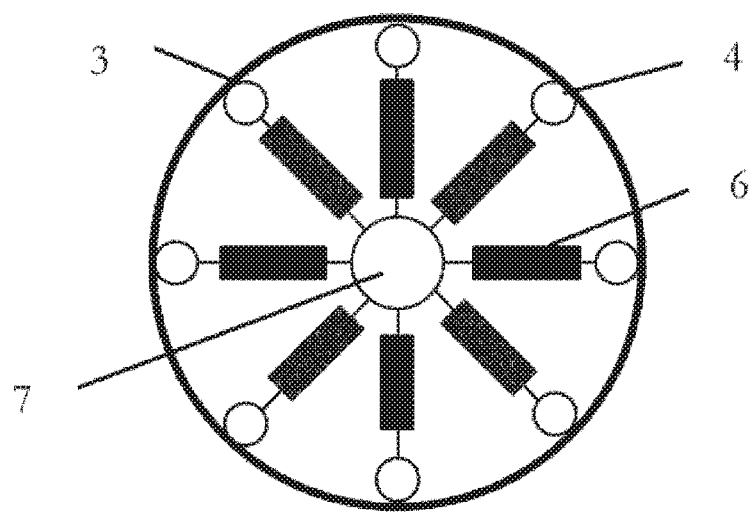
FIG. 2 is a cross-sectional view of a remediation system based on pollution obstruction for underground water with DNAPL pollutant according to an embodiment of the present disclosure.

FIG. 1 is a longitudinal cross-sectional view of a vertical obstructing wall and a recharging well according to an embodiment of the present disclosure; and FIG. 2 is a cross-sectional view of a remediation system based on pollution obstruction for underground water with DNAPL pollutant according to an embodiment of the present disclosure.

Referring to FIG. 1 and FIG. 2, a remediation system based on pollution obstruction for underground water with DNAPL pollutant includes a vertical obstructing wall 3, a pump-out treating unit and a recharging unit 4.

In a specific embodiment, the vertical obstructing wall 3 is composed of an HDPE geotechnical membrane with a thickness of 2 mm to 4 mm. An upper end of the geotechnical membrane extends beyond the ground surface up to a height of 30 to 50 mm, and a lower end of the geotechnical membrane is buried in a resisting floor 5 of a target aquifer water in the polluted area. In this way, an unpolluted area 1 is isolated from a polluted area 2 to prevent the polluted underground water in the polluted area 2 from further spreading into the unpolluted area 1. The term "water resisting floor" has a conventional meaning in the art and refers to an aquifuge at the bottom of the aquifer. It is easy to be understood that the vertical obstructing wall 3 may also be composed of geotechnical membrane of other materials such as EVA geotechnical membrane, or may be other obstructing members that can function to obstruct water. Optionally, the HDPE geotechnical membrane has a relative good performance.

The pump-out treating unit includes a water pumping unit 7 and an overground treatment facility 6. The water pumping unit 7 includes a plurality of water pumping wells, each of which has a diameter of 300 to 400 mm, so as to pump the underground water in the polluted area out for an overground treatment. The overground treatment facility 6 includes a plurality of water pumps, a plurality of water guiding pipes and a plurality of filler zones. Water inlet ends of the water guiding pipes are connected to well pipes of the respective water pumping wells. The polluted underground water is sent to the filler zones by the water pumps for treatment to remove the DNAPL. The filler zones are located at the surface of the ground, and a functional structure of each of the filler zones may be determined by types of pollutant to be treated. For example, if the polluted underground sewage to be treated contains nitrobenzene pollutants, the filler zone may employ a functional structure of combination of zero-valent iron and persulfate slow-release materials. Lengths of the filler zones (l) in different regions of the polluted area are proportional to logarithms of concentrations of pollutants (c) in the underground water in the respective different regions, that is, $l_1/l_2 = \ln c_1 / \ln c_2$, to ensure that there is a good remediation effect for the underground water with different pollution levels after being remediated in the filler zones. The water that has been treated in the filler zones is sent to the recharging unit 4 through the water guiding pipes.

The recharging unit 4 includes a plurality of recharging wells having a pipe diameter of 30 to 50 mm. The recharging unit 4 is deployed when the vertical obstructing wall 3 is deployed by slotting on the ground, thereby saving the project cost. The well pipes closely abut to the vertical obstructing wall 3 and are located at an inner side of the vertical obstructing wall, that is, at a side of the vertical obstructing wall facing towards the polluted area 2. The well pipes are densely arranged at an upstream zone with heavy pollution. As the pollution level of underground water is weakened, the arrangement of the well pipes is gradually sparse. Spacings by which the recharging wells in different regions (r) are arranged are inversely proportional to arithmetic square root values of concentrations of pollutants (c) in the underground water in different regions of the polluted area, that is, $r_1/r_2 \propto \sqrt{c_2/c_1}$. The maximum spacing is of 5 to 8 m. An upper end of each well pipe and the upper edge of the geotechnical membrane of the vertical obstructing wall 3 are flush with each other and both extend beyond the ground surface up to a height of 30 to 50 mm. A lower end of each well pipe is located 15 to 30 mm above the water resisting floor 5 of the target aquifer. There is no sieve pore in the recharging well. The recharging water that has been treated in the filler zones is totally returned from the bottom of the recharging well to the target aquifer, so that the recharging water can fully dissolve most of the DNAPL which is located in the lower region of the target aquifer.

It can be easily understood that, as shown in FIG. 1 and FIG. 2, the vertical obstructing wall 3 encloses the polluted area into a circular area. Alternatively, the area enclosed by the vertical obstructing wall 3 may be not strictly limited in shape and may even have a square shape or other irregular shapes. The vertical obstructing wall 3 may be flexibly deployed by slotting on the ground based on the pollution situation. In the illustrated embodiment, the water pumping unit 7 is arranged in the central area of the polluted area and in a circular distribution. Alternatively, the water pumping treatment unit is not limited to such an arrangement, and may be flexibly arranged according to the pollution situation. Each filler zone may be equipped with more than one water pumping well and more than one recharging well, and the specific amount of the filler zones, the water pumping wells and the recharging wells may be flexibly chosen according to the pollution situation and the amount of polluted water to be treated.

A remediation method using the remediation system based on pollution obstruction for underground water with DNAPL pollutant described above includes the following steps.

In the first step, the vertical obstructing wall, the pump-out treating unit and the recharging unit are arranged based on a polluted area and a pollution level.

In practical project applications, after a vertical slot is formed in the ground, the vertical obstructing wall 3 is inserted into the vertical slot to the bottom of the slot, and the recharging unit 4 is deployed according to the pollution levels in different regions. The recharging unit 4 is deployed at a side close to the polluted area 2. After the deployment of the vertical obstructing wall 3 and the recharging unit 4, the water pumping unit 7 and the overground treatment facility 6 are deployed according to the polluted area and the pollution level.

In the second step, the polluted underground water is pumped to the ground surface by the pump-out treating unit for treatment to remove DNAPL. Specifically, the water pump is switched on, and the polluted underground water is transported by the water pumping unit 7 to the overground treatment facility 6 for treatment.

In the third step, a surfactant is added into the purified water, then the purified water is pumped into the target aquifer by the recharging unit 4 to enhance dissolution of DNAPL in the aquifer, and the water is pumped out again after a given interval time.

In the fourth step, the remediating process is repeated from the second step to the third step to circularly dissolve and remove the DNAPL in a manner that the surfactant is introduced by the recharging water, achieving an efficient remediation of the polluted underground water and avoiding a trailing and rebound phenomenon.

In summary, in the remediation system based on pollution obstruction for underground water with DNAPL pollutant and the remediation method according to the embodiments of the present disclosure, the underground water is pumped out for treatment and is backwashed by recharging on the basis of vertical obstructing to the polluted underground water, thereby solving the problem that the effect of the traditional pump-out treatment method is poor and that the trailing and rebound phenomenon often appears, and more effectively realizing the remediation of the underground water pollution. The deployed well pipes of the recharging unit are not only used as a recharging well to return the water that has been treated and added with the surfactant to the target aquifer, but can also be used as a monitoring well for underground water remediation effect. The underground water remediation effect may be monitored at any time without the need for additional well drilling, saving the project cost. At the same time, since the filler zones in the present system are located on the ground surface, the medium material may be flexibly replaced to obtain a good remediation effect.

With the remediation system and method based on pollution obstruction for underground water with DNAPL pollutant according to the present disclosure, the underground water remediation may be carried out by realizing a vertical obstruction to polluted underground water, and the underground water DNAPL pollution remediation may be more effectively realized on the basis of obstructing the polluted underground water.

The present disclosure may have the following advantages:

(1) With the remediation system based on pollution obstruction for underground water with DNAPL pollutant according to the present disclosure, the underground water pollution remediation project is carried out by realizing a vertical anti-seepage using the vertical obstructing wall, effectively controlling the volume of the treated underground water and greatly improving the remediation efficiency. Since the recharging well is closely arranged at the vertical obstructing wall and the recharging well is arranged in a vertical anti-seepage slotting process, the project cost may be saved.

(2) The recharging wells arranged in the remediation system based on pollution obstruction for underground water with DNAPL pollutant may further be used as monitoring wells for the underground water remediation effect, and may be used to monitor the underground water remediation effect at any time without the need for construction of additional wells, saving the project cost.

(3) The pollution obstruction based underground water DNAPL pollution remediation method of the present disclosure, in connection with the hydraulic backwash control of added surfactant, solves the problem that the effect of the traditional pump-out treatment method is poor and that a trailing and rebound phenomenon often appears. The circulating recharging as well as dissolution and removement of DNAPL in the remediation process reduce the geological damage of the remediation to the polluted area.

(4) With the pollution obstruction based underground water DNAPL pollution remediation method of the present disclosure, since the filler zones are located on the ground surface, the medium material may be flexibly replaced to obtain a good remediation effect.

The object, the technical solutions, and the advantages of the present disclosure are further described in detail in connection with the above embodiments. It is to be understood that the foregoing description only relates to exemplary embodiments of the present disclosure and is not intended to be a limitation to the present disclosure. All modifications, equivalent substitutions, improvements and the like are intended to be included within the scope of the present disclosure.

What is claimed is:

1. A remediation system based on pollution obstruction for underground water with dense nonaqueous phase liquid (DNAPL) pollutant, comprising:

a vertical obstructing wall, a pump-out treating unit and a recharging unit, wherein the vertical obstructing wall is arranged in a slot at a periphery of a polluted area to obstruct polluted underground water within the vertical obstructing wall;

wherein the pump-out treating unit comprises a plurality of water pumping wells and an overground treatment facility that are distributed in the polluted area, the plurality of the water pumping wells being configured to pump the polluted underground water out and send it into the overground treatment facility so as to treat and remove DNAPL pollutants;

wherein the recharging unit comprises a plurality of recharging wells, the plurality of recharging wells being arranged in the same slot where the vertical obstructing wall is arranged, water that has been treated by the overground treatment facility being recharged into a target aquifer in the polluted area by the plurality of the recharging wells, the plurality of recharging wells being arranged on a side of the vertical obstructing wall facing towards the polluted area in such a manner that they are closely adjacent to the vertical obstructing wall; and wherein a lower end of the vertical obstructing wall is buried in a water resisting floor of the aquifer in the polluted area to form a sealing area with the water resisting floor, and a lower end of each of the recharging wells is located 15 to 30 mm above the water resisting floor.

2. The remediation system according to claim 1, wherein a height of an upper end of the vertical obstructing wall extending beyond the ground surface is between 30 mm and 50 mm, optionally the vertical obstructing wall is a HDPE geotechnical membrane having a thickness of 2 to 4 mm.

3. The remediation system according to claim 1, wherein there is no sieve pore in each recharging well, and wherein an upper end of each recharging well is flush with the upper end of the vertical obstructing wall.

4. The remediation system according to claim 1,
wherein each recharging well has a diameter of 30 to 50 mm, and
wherein a maximum spacing is between 5 m and 8 m.

5. The remediation system according to claim 1, wherein the water pumping well has a diameter of 300 to 400 mm.

6. The remediation system according to claim 1, wherein the overground treatment facility comprises a plurality of water pumps, a plurality of water guiding pipes and a plurality of filler zones, wherein each of the filler zones corresponds to at least one water pumping well and at least one recharging well, the water pumping well, the filler zone and the recharging well are sequentially connected by the water guiding pipes, and the water pump is disposed between a water inlet end of the water guiding pipe and the water pumping well, and wherein each filler zone is configured to treat the polluted underground water to remove DNAPL.

7. A remediation method using a remediation system based on pollution obstruction for underground water with dense nonaqueous phase liquid (DNAPL) pollutant, the remediation system including a vertical obstructing wall, a pump-out treating unit and a recharging unit, wherein the vertical obstructing wall is arranged in a slot at a periphery of a polluted area to obstruct polluted underground water within the vertical obstructing wall, the pump-out treating unit comprises a plurality of water pumping wells and an overground treatment facility that are distributed in the polluted area, the plurality of the water pumping wells being configured to pump the polluted underground water out and send it into the overground treatment facility so as to treat and remove DNAPL pollutants, the recharging unit comprises a plurality of recharging wells, the plurality of recharging wells being arranged in the same slot where the vertical obstructing wall is arranged, water that has been treated by the overground treatment facility being recharged into a target aquifer in the polluted area by the plurality of the recharging wells, the plurality of recharging wells being arranged on a side of the vertical obstructing wall facing towards the polluted area in such a manner that they are closely adjacent to the vertical obstructing wall, and a lower end of the vertical obstructing wall is buried in a water resisting floor of the aquifer in the polluted area to form a sealing area with the water resisting floor, and a lower end of each of the recharging wells is located 15 to 30 mm above the water resisting floor, the remediation method comprising steps of:
(1) deploying the vertical obstructing wall, the pump-out treating unit and the recharging unit based on a polluted area and a pollution level;
(2) pumping the polluted underground water to the ground surface by the pump-out treating unit for treatment to remove DNAPL;
(3) adding a surfactant to the water that has been treated by the pump-out treating unit, then enabling the treated water to enter the target aquifer by the recharging unit and leaving it alone for a given interval time to dissolve and remove DNAPL in the aquifer; and
(4) repeating the steps (2) to (3) to circularly dissolve and remove the DNAPL.

8. The remediation method according to claim 7, wherein the recharging wells in the recharging unit are also used as monitoring wells for underground water remediation effect.

9. The remediation method according to claim 7, wherein a height of an upper end of the vertical obstructing wall extending beyond the ground surface is between 30 mm and 50 mm, optionally the vertical obstructing wall is a HDPE geotechnical membrane having a thickness of 2 to 4 mm.

10. The remediation method according to claim 9, wherein the recharging wells in the recharging unit are also used as monitoring wells for underground water remediation effect.

11. The remediation method according to claim 7, wherein there is no sieve pore in each recharging well, and
wherein an upper end of each recharging well is flush with the upper end of the vertical obstructing wall.

12. The remediation method according to claim 11,
wherein the recharging wells in the recharging unit are also used as monitoring wells for underground water remediation effect.

13. The remediation method according to claim 7,
wherein each recharging well has a diameter of 30 to 50 mm,
and
wherein a maximum spacing is between 5 m and 8 m.

14. The remediation method according to claim 13,
wherein the recharging wells in the recharging unit are also used as monitoring wells for underground water remediation effect.

15. The remediation method according to claim 7,
wherein the water pumping well has a diameter of 300 to 400 mm.

16. The remediation method according to claim 15,
wherein the recharging wells in the recharging unit are also used as monitoring wells for underground water remediation effect.

17. The remediation method according to claim 7,
wherein the overground treatment facility comprises a plurality of water pumps, a plurality of water guiding pipes and a plurality of filler zones, wherein each of the filler zones corresponds to at least one water pumping well and at least one recharging well, the water pumping well, the filler zone and the recharging well are sequentially connected by the water guiding pipes, and the water pump is disposed between a water inlet end of the water guiding pipe and the water pumping well, and wherein each filler zone is configured to treat the polluted underground water to remove DNAPL.

18. The remediation method according to claim 17, wherein the recharging wells in the recharging unit are also used as monitoring wells for underground water remediation effect.

* * * * *